May 4, 1937.    A. W. MILLS    2,079,418
SUBTRACTING AND TOTALING DEVICE
Filed Sept. 23, 1932    7 Sheets-Sheet 1

INVENTOR
Albert W. Mills
BY
W. M. Wilson
ATTORNEY

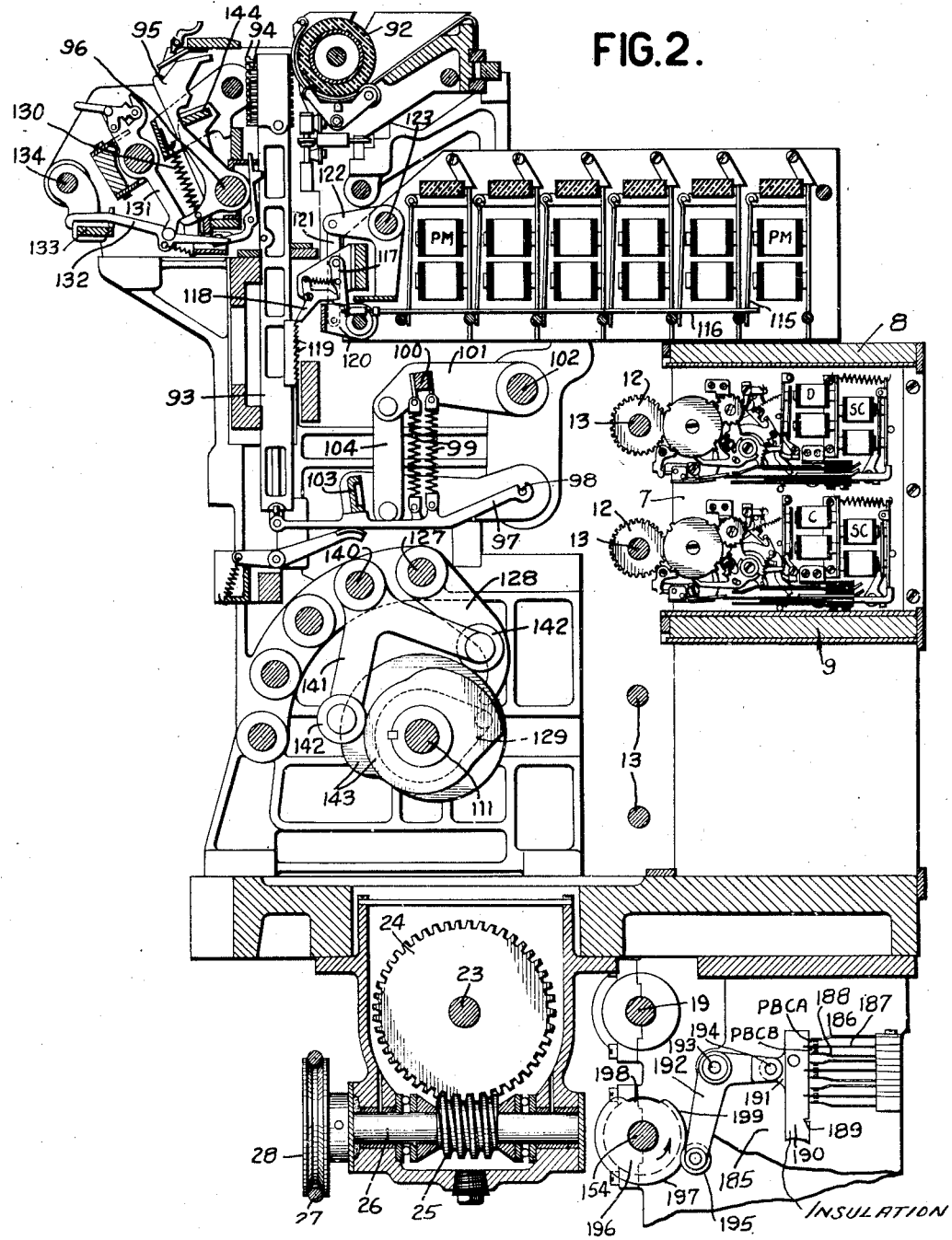

May 4, 1937.  A. W. MILLS  2,079,418
SUBTRACTING AND TOTALING DEVICE
Filed Sept. 23, 1932   7 Sheets-Sheet 3

| Counter C | Counter D |
|---|---|
| 0 0 1 6 | 9 9 8 4 |
| 9 9 8 3 | 0 0 1 7 |
| 9 7 7 5 | 0 2 2 5 |
| 0 1 7 2 | 9 8 2 8 |
| 9 9 4 6 | 0 0 5 4 |
| 0 2 1 0 | 9 7 9 0 |
| 0 1 2 9 | 9 8 7 1 |
| 9 9 3 8 | 0 0 6 2 |
| 9 9 4 2 | 0 0 5 8 |
| 0 1 6 5 | 9 8 3 5 |
| 0 0 1 6 | 0 0 0 0 |
| 0 0 0 0 | 0 0 1 7 |
| 0 0 0 0 | 0 2 2 5 |
| 0 1 7 2 | 0 0 0 0 |
| 0 1 8 8 | 0 2 4 2 |

—1 6
1 7
2 2 5
—1 7 2
*   5 4

—2 1 0
—1 2 9
6 2
5 8
*—1 6 5

146

INVENTOR
Albert W. Mills
BY
W. M. Wilson
ATTORNEY

May 4, 1937.    A. W. MILLS    2,079,418
SUBTRACTING AND TOTALING DEVICE
Filed Sept. 23, 1932    7 Sheets-Sheet 5
FIG.8
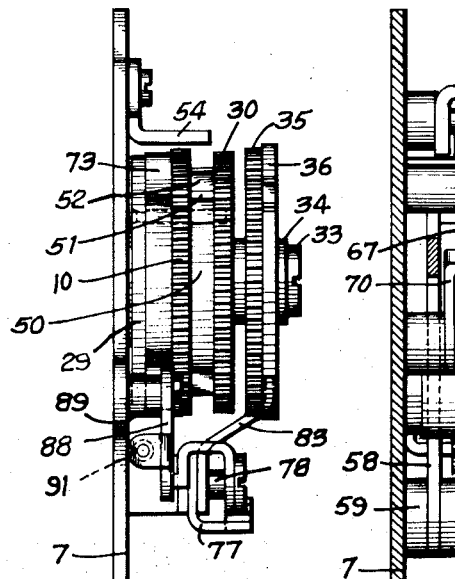
FIG.9.
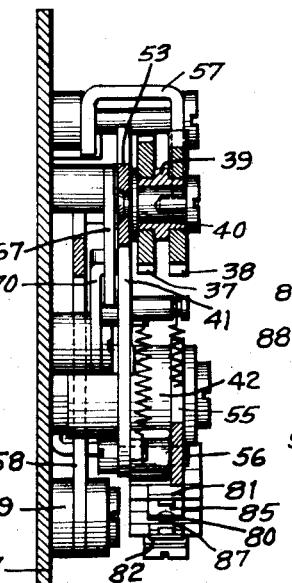
FIG.10.
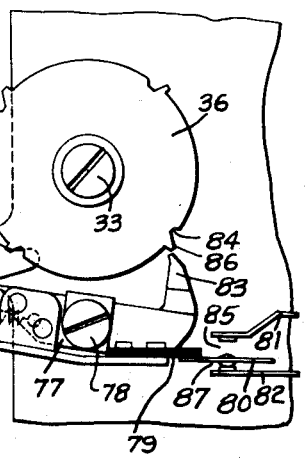
FIG.11.
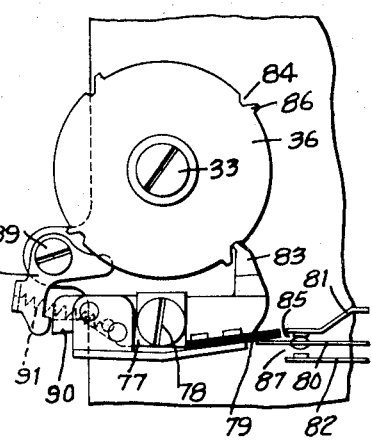
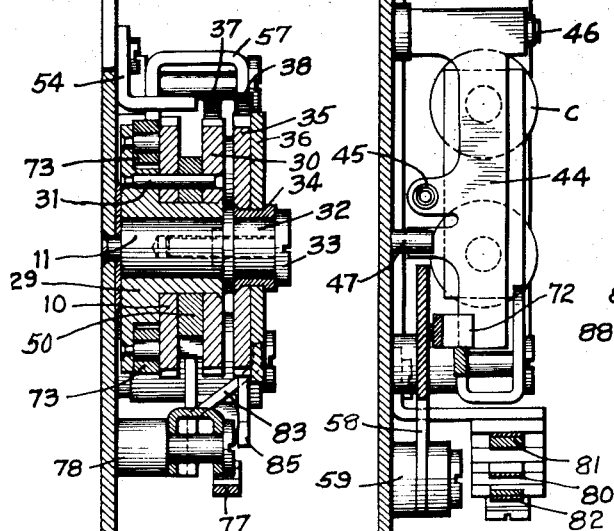
INVENTOR
Albert W. Mills
BY
W. M. Wilson
ATTORNEY May 4, 1937.  A. W. MILLS  2,079,418

SUBTRACTING AND TOTALING DEVICE

Filed Sept. 23, 1932  7 Sheets-Sheet 6

May 4, 1937.　　　　A. W. MILLS　　　　2,079,418

SUBTRACTING AND TOTALING DEVICE

Filed Sept. 23, 1932　　　7 Sheets-Sheet 7

Patented May 4, 1937

2,079,418

UNITED STATES PATENT OFFICE 2,079,418

SUBTRACTING AND TOTALING DEVICE

Albert W. Mills, East Orange, N. J., assignor, by mesne assignments, to International Business Machines Corporation, New York, N. Y., a corporation of New York Application September 23, 1932, Serial No. 634,454

12 Claims. (Cl. 235—61.8)

The present invention relates to improvements in accumulating and total taking devices and more particularly is concerned with perforated card controlled apparatus which is adapted to receive difference classes of entries such as debits and credits and furnish a true net balance as a result.

An object of the invention is to provide an improved and simplified subtracting device.

Another object of the present invention is to provide a simple and yet effectve form of total taking device.

It is an object of the invention to supply an advanced form of electrical control devices for adapting a duplex accumulator for addition, subtraction and balance printing control.

A further object of the invention is to provide an improved electrical selection control between two accumulators to govern the entry of true numbers and complements.

Another object of the invention is to furnish a transferring device which is adapted to serve in controlling total taking and balance printing.

The transferring devices are also adapted to indicate the presence of the balance as a true number on one or the other accumulator.

The electrical connections to the accumulator for use in total taking are adapted to be changed for the taking of a progressive or subtotal.

The disclosed accumulating devices are designed so that each denominational order may be placed in the machine separately and connected therein to the machine controls and the other orders. The various orders may be connected to serve together as a single adding accumulator, or they may be separated into two sets of orders; one set to receive debit items and complements of credit items, and the other set to receive credit items and the complements of debit items.

It is possible to condition the machine so that one set of orders alone may act as a subtraction device in adding the true numbers of one class of item and complements of the other class of item. When the accumulators are conditioned for subtraction, the total or balance printing control is selectively placed under control of the set of orders containing the balance as a true number.

According to the present invention each accumulator order is provided with two magnets, one of which is used to control the clutching of the related accumulator wheel with the driving means, and the other is used to declutch the wheel from the driving means. The magnets are used for control of the accumulator during accumulating and total taking operations.

The declutching magnet is operated during subtraction to disengage the accumulator wheel after the entry of a complement. The same magnet is operated during the taking of a clearing total to declutch the wheel at zero. During the taking of progressive total, the declutching magnet is de-energized so that the wheel remains engaged with the driving means to be turned to its original position.

The clutching magnet is operated during addition, transferring and subtraction operations to start the accumulator wheel turning to add a true number or a complement. When a clearing or progressive total is to be taken the same magnet is energized early in the cycle to engage the wheel with the driver.

Each accumulator order is also provided with a pair of contacts to be used primarily for control of transferring. The contacts, however, exercise further control by being selectively connected to the magnets in the accumulator and other parts of the machine so that they may be used to control the total taking and total printing operations. The one contact is closed when the related accumulator wheel is located in the nine position. The other contact is closed when the wheel passes from nine to zero.

The nine contact associated with the highest order wheel is used to test for a minus balance. If the contact is closed, it is evident that the associated accumulator contains a complement and the total taking devices are adapted to take the total under control of the other accumulator containing the balance as a true number.

The contact closed at zero is used during clearing total taking operations to time the energization of the declutching magnet to disengage the related wheel from the driver and stop the wheel in the zero position. This contact is also used during clearing and progressive total taking operations to time the operation of the printing devices to record the total.

From the foregoing outline of the many uses of the clutch magnets and transfer contacts in the accumulator, it is apparent that by means of the construction disclosed there are eliminated many parts which ordinarily serve but a single purpose.

The accumulating and total taking devices disclosed herein are an improvement on the devices for similar purposes set forth in the application of J. R. Peirce, Serial No. 620,653, filed July 2, 1932.

Further objects, uses and advantages of the present invention will be hereinafter pointed out in the accompanying specification and claims and shown in the drawings which show by way of illustration what I now consider to be a preferred embodiment of the invention.

In the drawings:

Fig. 2 is a vertical section taken through the center of the machine. The printer, accumulator, control cams and other devices in the machine are illustrated in this view.

Fig. 8 is a front and sectional elevation view of the accumulators taken along the line 8—8 in Fig. 7.

Fig. 9 is a sectional elevation view of the accumulators taken along the line 9—9 in Fig. 7.

Fig. 10 is a detail view of the transfer control contacts as positioned when the related accumulator wheel is located in the zero position after having passed from nine to zero.

Fig. 11 is a detail view of the transfer control contacts as positioned when the associated accumulator wheel is located in the nine position.

Figures 3, 4, 5, 6:
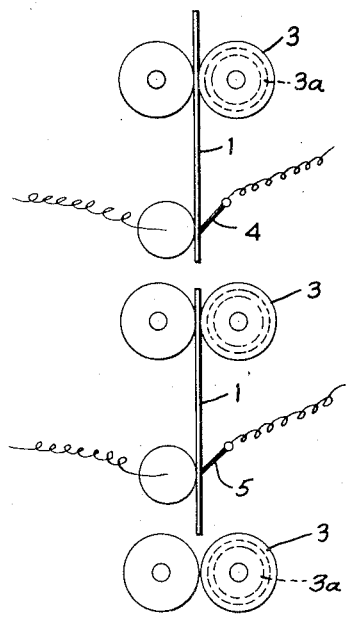
Fig. 3 is a detail view of a portion of a record card used to control the machine.
Fig. 4 is a diagrammatic view showing the manner of feeding the cards with respect to the perforation sensing brushes.
Fig. 5 is an illustration of the operation of the machine in adding and subtracting the credit and debit entries registered on the accumulators of the machine.
Fig. 6 is a portion of a record slip showing the recording of some of the items shown in Fig. 5.

Referring to the portion of the record card 1 disclosed in Fig. 3, a plurality of columns of index point positions, ranging from 0 to 9, are shown. The amount which is to be added or subtracted is entered by perforations in successive columns. Thus the number 874 is entered by punching the card in the 8 position in the first column and in the 7 position in the second column and in the 4 position in the third column. The amount is punched in this manner whether it is to indicate a credit item or a debit item.

If the card contains a credit item, a control perforation 2 is punched in the upper portion of the card to control the machine to effect reverse operation of adding and subtracting in the two accumulators provided in the machine. In the absence of such a perforation the machine will effect adding of a true number in a debit accumulator and adding of the complement of the true number in a credit accumulator. In Fig. 3, the perforation 2 is shown above the ninth column of data on the card. In actual practice this perforation may be placed above any of the columns and the machine may be plugged accordingly.

The card is fed through the machine by feed rollers 3 (Fig. 4) driven by pinions 3a (shown in Fig. 1) and is analyzed by perforation sensing brushes 4 and 5. The card is fed past the brushes with the 9 position passing under the brushes first, followed by the eight position, then the seven, etc., in a manner which is well known in this art.

The upper row of brushes 4 is used for group control sensing while the lower brushes 5 effect the adding and subtracting of the data contained on the card. When an item on the card is to be added on one of the accumulators and a perforation appears in the first column in the eight position (as in Fig. 3) then when the perforation passes under the brush 5, the related accumulator wheel is clutched to the driving means to commence adding one unit as each of the succeeding points on the card passes under the brush 5. When the zero position is passing under the brush, the machine automatically declutches the accumulator wheel so that it stops turning. It will thus have turned eight steps to accumulate the value 8. In the second column the brush 5 will contact with the perforation in the 7 position and clutch the respective accumulator wheel to commence adding at this point, and 7 will have been added when the accumulator wheel is declutched. In the third column the accumulator will be thrown in when the brush senses the perforation in the 4 position and 4 will be added.

During the entry of a debit item, the described adding operation takes place in the debit accumulator. At the same time that this is occurring, the credit accumulator is controlled so as to enter the complement of the number added in the debit accumulator. In order that the credit accumulator may receive the complemental amount its accumulator wheels are clutched so as to commence adding in all orders except the units order when the 9 position on the card passes under the brushes 5. The units order wheel is clutched one step before the other wheels. When a perforation is sensed by the brushes 5 in any particular column, the accumulator wheel in the credit accumulator is declutched. Thus with the card of Fig. 3, the credit accumulator wheel of the first column will commence accumulating as the 9 position passes the related brush 5. Then, as the 8 position passes the brush, the perforation in this position will be sensed and the energization of an electromagnet will cause the debit accumulator wheel to be engaged for adding the true number. At the same time another magnet in the credit accumulator is energized and acts to declutch the related wheel in the credit accumulator so that it will stop turning. The wheel in the credit accumulator will thus have turned one point to accumulate the value "1" which is the complement of the numeral 8 which has been accumulated in the debit accumulator wheel of the same order. In the second column, the wheel commences to rotate when the position 9 passes the brushes and is declutched when the 7 position passes the brush after the value 2 has been added to the debit wheel, this being the complement of the value 7 added to the credit wheel. In the third column or the units order of the figure being considered, the associated debit wheel is clutched at the 10 position (i. e., at a point one position before the 9 position) and is declutched when the 4 position reaches the brush, thus the wheel will have added the value 6 which is the tens complement of the number 4.

Should the card contain a credit item, it is perforated with the perforation 2 as is the card shown in Fig. 3. When the perforation 2 is present, it is sensed by a brush 4 in the upper row of sensing brushes and subtracting switching devices are actuated and serve to reverse the order in which the amount is added in the two accumulators.

The amount is then added as a true number in the credit accumulator and the complement of the amount is added in the debit accumulator. The devices for performing this function of reversing the order of numeral reception by the two accumulators is described hereinafter.

*Accumulator driving mechanism*

Figure 1:
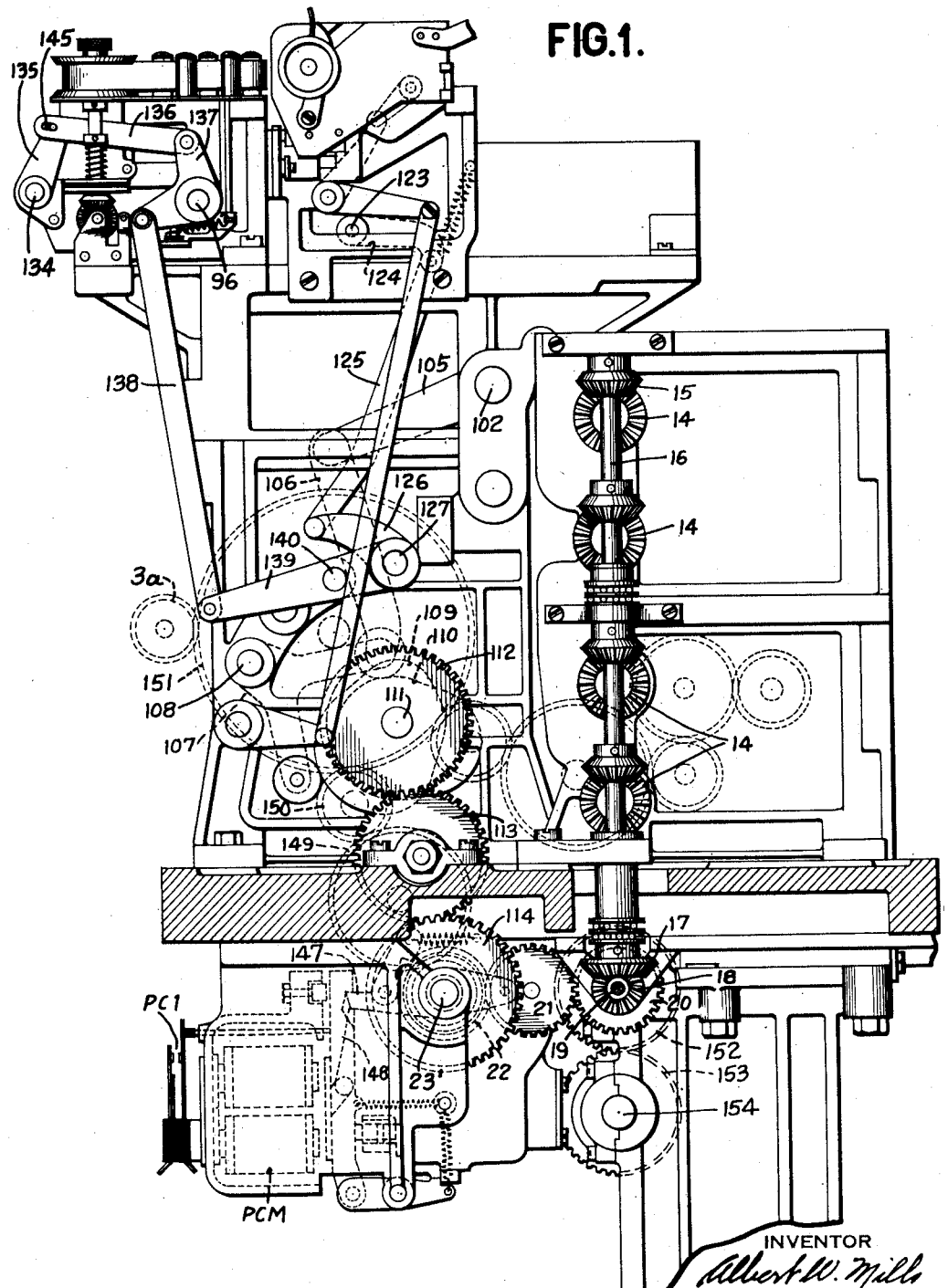
Fig. 1 is a side elevation view of the machine showing the driving and operating connections.
Figure 7:
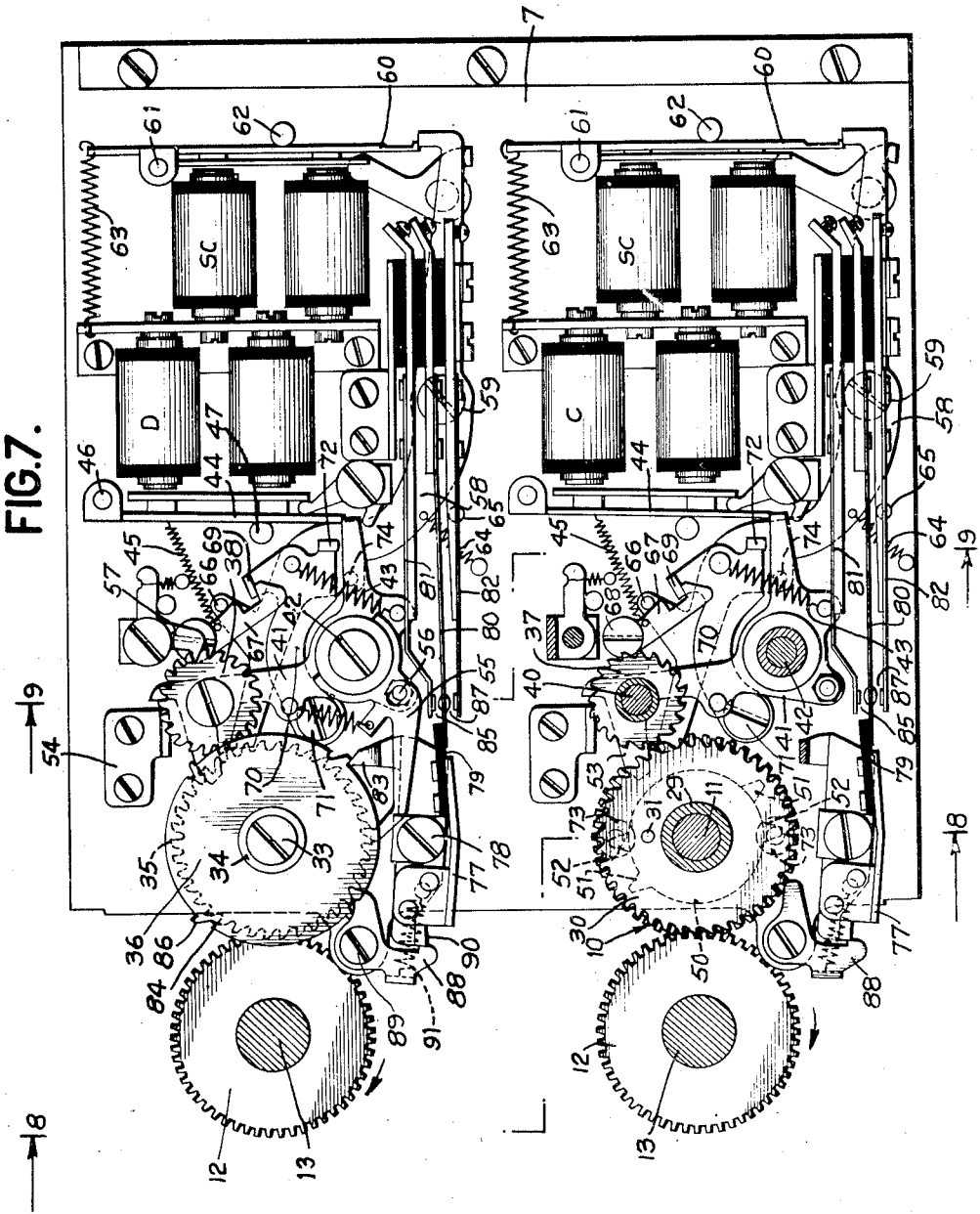
Fig. 7 is a side elevation view of an accumulator assembly showing two accumulating orders. Some of the parts in the lower order are sectioned and other parts are removed to clearly reveal the totalizing mechanism.

In Figs. 2 and 7 is shown the manner of mounting two accumulator orders on a plate 7. This plate may be held in the machine by sliding it between supporting frame members 8 and 9 (Fig. 2). A number of these units may be mounted in the machine side by side. Other of such units may be mounted in the space provided below the frame member 9. As shown in Fig. 7, each accumulator has a gear 10 rotatably mounted on a stud 11 fixed in the plate 7. This gear is in constant mesh with a gear 12 mounted on a shaft 13 upon which there is also mounted a bevel gear 14 (Fig. 1) meshing with a bevel gear 15 on a vertical shaft 16. The shaft is provided with four bevel gears, one for each drive shaft 13. On the lower end of the shaft is mounted a bevel pinion 17 meshing with a bevel pinion 18 on a shaft 19 which has a gear 20 meshing with an idler gear 21 which in turn meshes with a gear 22 on shaft 23 (Fig. 2) in axial alignment with a shaft 23' (Fig. 1). The shaft 23 is provided with a worm wheel 24 (Fig. 2) meshing with a worm 25 on a shaft 26 which is driven by a belt 27 on grooved pulley 28 fixed to the shaft 26. The belt 27 is driven by an electric motor or some other source of power. The motor is constantly running while the machine is in operation, so that shaft 16 is turning constantly. Through the described driving connections, the gear 10 in each accumulator order is adapted to rotate constantly.

At the extremities of the shaft 23 (Fig. 2) are magnetically controlled clutch devices adapted upon actuation to form a driving connection at one end to a card feeding device and at the other end to a shaft 23' for driving a printing mechanism.

The shaft 23 carries, adjacent to gear 22 (Fig. 1) a notched disk adapted to be engaged by a dog 147 pivotally mounted upon an arm integral with a gear 114. An armature latch 148 normally holds dog 147 out of engagement with the driving disk. When the printing clutch magnet PCM is energized, it draws latch 148 to the left, releasing dog 147 so that the printing mechanism drive gear 114 is clutched to the driving shaft. Upon deenergization of magnet PCM, armature 148 is moved by a spring into the path of a projecting toe on dog 147 to throw the dog out of engagement with the clutch disk. The arm on gear 114 is also engaged by armature 148 to prevent further movement of the gear.

Shaft 23 carries at its other end another clutch disk with which cooperates a dog operated under control of a card feed clutch magnet CFCM, Fig. 13, referred to hereinafter. The engagement of these clutch elements is controlled in a manner similar to that described above with reference to magnet PCM. However, the card feed clutch is engaged before the print clutch to allow more time early in a subtraction operation. The dog is connected to a gear meshing with a train of gears 149, 150, 151 driving the card feed gears 3a. Other idler gears drive through gear 152 to gear 153 mounted on the shaft 154. The shaft is thereby adapted to be rotated in a counterclockwise direction for each operation of the card feeding mechanism.

*The credit and debit accumulators*

As both of the accumulators shown in Fig. 7 are similar in construction, a description of one applies also to the other.

The gear 10 in each accumulator order is mounted on a bushing 29 (Fig. 8) and keyed to another gear 30 by means of a dowel pin 31 fastened to the bushing. The unit comprising the gears and the bushing is free to rotate constantly on the stud 11. The stud is extended by attaching a shouldered sleeve 32 thereon by a screw 33. Between the head of the screw and the shoulder on the sleeve is located a hub 34 carrying an accumulator gear wheel 35 and a transfer cam disk 36. Thus, the two separate gear units may rotate independently on the stud 11. The unit containing gear 30 is rotated one-half revolution for each cycle of operation of the machine. The accumulator gear 35 is provided with forty teeth, therefore one quarter revolution of this gear represents a complete adding operation of ten steps.

The two gears 30 and 35 are adapted to be clutched together so that the accumulator gear 35 may be driven a differential distance by the drive gear 30. The clutching device includes two pinions 37 and 38 (Figs. 7 and 9) which are held together by a bushing 39 on a stud 40 mounted on a clutching lever 41 pivoted at 42 (Fig. 7). The pinion 37 is adapted to engage with the gear 30 but the teeth thereon are normally out of engagement with the gear teeth. The other pinion 38 maintains engagement with the teeth on accumulator gear 35. A spring 43 attached to lever 41 urges the lever counterclockwise to clutch pinion 37 with gear 30 for driving, but the lever is prevented from moving by the contact of the end of a horizontal arm thereon with the end of an armature 44 pivoted at 46 and associated with the accumulator magnet C or D, the armature being held in such a position against a stop stud 47 by a spring 45. When the magnet is energized, attracting the armature, the lever 41 is released and then the spring 43 rocks the pinion 37 into mesh with the gear 30.

As explained hereinbefore, the two accumulators are selectively clutched with the driving means according to whether an item is a credit or a debit entry. The lower counter or accumulator (Figs. 2 and 7) is adapted to receive the true amounts of credit items and the complements of debit items, while the upper accumulator or debit counter receives the true amounts representing debit items, and the complements of credit items. The energization of a credit counter magnet C during credit item entering or the energization of a debit counter magnet D during debit item entering, is effected by the sensing of an amount perforation in one of the data columns of the record card 1 (Fig. 3) by the respective sensing brush 5 (Fig. 4). The pinion 37 is then thrown into mesh with the gear 30 while the latter is rotating. Through the connections between pinions 37 and 38 and gear 35, the accumulator gear is caused to rotate until the zero position on the card reaches the brush 5 at which time the pinion 37 is thrown out of mesh by a cam 50 (Figs. 7 and 8) which cooperates with the clutching lever 41. This cam is fixed with respect to gears 10 and 30 and thus is constantly rotating with them. As shown in Fig. 7, two cam projections 51 and two projections 52 are provided on the cam 50 because the cam is timed to turn a half revolution for each accumulating cycle. After the pinion 37 is thrown into mesh with gear 30 and commences to rotate gear 35, as soon as the cam projection 51 reaches an arm 53 extending from lever 41, the cam rocks the lever clockwise about the pivot 42 to move the pinion 37 out of mesh with gear 30 so that the accumulating gear 35 is declutched from the driving means and ceases to rotate. The lever 41 is latched in the declutched position by the armature 44.

When the clutching lever 41 is moved counterclockwise to clutching position, an extension on the top of the lever engages a shoulder on a plate 54 which is located properly to stop the lever. An impositive latch or pawl 55 is pivoted at 42 and connected to lever 41 by a pin and slot connection 56. When the lever holds the clutching pinions out of engagement, pawl 55 engages the teeth on gear 35. The pawl also prevents overthrow of the gear as it is declutched. The pinion 38 is provided with an impositive latch 57 pivoted on plate 7.

The foregoing description deals mainly with the addition of an amount in an accumulator. If it is desired to subtract an amount from an accumulator, the complement of the amount is added to the accumulator. This is done at the same time that the true amount is being added to the other accumulator. In adding the complement, one selected set of counter magnets C or D is energized automatically at the nine index position (the units order at the ten position) to mesh pinions 37 with gears 30 and start the wheels rotating. Each wheel continues to rotate until a perforation is sensed, then the gears in the accumulator receiving the complement are declutched at the same time that the related gears in the other accumulator are put into mesh with the driving gears. The connections for operating the lever 41 to secure the desired relationship between the clutching of one accumulator and the declutching of the other accumulator will now be described.

A subtraction and cancellation control magnet SC (Fig. 7) is energized under control of the record card perforation sensed by the lower brush 5 at the same time that said perforation controls the energization of the accumulator magnet in the other accumulator. A magnet SC is provided for each accumulator order and is associated with devices for operating clutching lever 41 to declutch gear 35. A long lever 58 is pivoted at 59 on plate 7 and has one end cooperating with the bottom of an armature 60 associated with magnet SC. The armature is pivoted at 61 and held normally against a stop stud 62 by a spring 63. When the magnet is energized, releasing the end of the lever 58, a spring 64 urges the lever in a counterclockwise direction against stop 65, and a pin 66 on the lever is pushed against a latch 67 pivoted at 68. The latch 67 normally engages a shoulder 69 on an arm 70 pivoted at 71. Another shoulder 72 on the arm 70 is urged towards the horizontal arm on lever 41 by means of the spring 43 attached to a stud on the arm. The sudden release of the arm 70 after the pin 66 pushes the latch 67 away from shoulder 69, causes the two parts 70 and 41 to rock clockwise under the urging of the spring 43 connecting the two, thereby swinging the lever 41 in a clockwise direction to declutch the gears. This action is accomplished because spring 43 tends to fold together and shorten. It can shorten only when member 70 and frame 41 are rocked in a clockwise direction. Therefore, when the latch 67 releases the spring it moves the frame to declutch the gears. The parts 67 and 70 delay declutching a moment after magnet SC is energized. The lever 41 is latched in normal position by the armature 44.

At the end of each machine cycle the lever 58 is restored by one of a pair of rollers 73 mounted on a flange of the bushing 29 (Fig. 8). The roller strikes the lower side of the left end of the lever (Fig. 7) rocking it clockwise and latching the right end under armature 60. While restoring, a pin 74 on lever 58 strikes the lower edge of arm 70 and restores the arm, placing shoulder 69 above the latching face on latch 67 and tensioning spring 43 to urge lever 41 in the proper direction for clutching the gears. The parts 67 and 70 provide means for controlling the declutching time so that a uniform disengagement of the gears is secured during the operation of the machine at listing or tabulating speed.

From the foregoing section of the description it is clear that the accumulator wheels are clutched to the driving gears by means under control of the accumulator magnets C or D, and they are declutched by the magnets SC at differential times during a cycle or by cam 51 at the end of a cycle. During ordinary adding operations, the magnets SC are not used, the accumulator wheels being clutched at the differential times by the magnets C or D and declutched at the zero position by cams 51.

When the machine is set for subtraction control and a debit item is entered, the magnets C are energized early in the cycle to clutch the credit accumulator wheels to begin adding the complement of the debit amount. Then, when a certain amount perforation in the card is sensed, the related credit accumulator magnet SC is energized to declutch a credit wheel at the differential point, and at the same time the related debit accumulator magnet D is energized to clutch the associated debit wheel to start the adding of the true debit amount.

At the end of the cycle, after adding the debit amount, the gears in the debit accumulator are declutched by cams 51. If a credit item is entered, it is presented on a card with a special perforation 2 (Fig. 3) and switch devices, to be described hereinafter, are operated to reverse the usual entry of the true number and the complement. The magnets D are energized early in the cycle to clutch the debit accumulator wheels to begin adding the complement of the credit amount. When each amount perforation in the card is sensed, the related debit accumulator magnet SC is energized to declutch a debit wheel at the differential instant, and at the same time the related credit accumulator magnet C is energized to clutch the associated credit wheel to start adding the true credit amount. At the end of the cycle the gears in the credit accumulator are declutched by cams 51. Both accumulator gear clutching devices are latched after accumulation and are ready for the next operation.

Fig. 5 shows an example of the operations performed by the machine in accumulating credit and debit entries. The first item, a credit amount of 16, is added in credit counter C at its face value, and the complement of 16, or 9984 is added in debit counter D. The second item, a debit amount of 17, is added as a true number in counter D and as a complement in counter C. After adding a series of credit and debit amounts the balance may be found on one counter or the other as a true number representing a positive or negative balance. In the example given in Fig. 5, it is noted that upon taking a total of the first four items, a positive balance of 54 is found on the debit counter and the complement of 54 is registered on the credit counter. A reading of the accumulator wheels after registering the first eight items shows a negative or credit balance of 165 registered on the credit counter wheels, and the complement of the balance or 9835 registered on the debit wheels.

Accumulator transferring devices

For effecting carrying or transferring from one order to the next order in an accumulator, a frame 77 pivoted at 78 is adapted to cooperate with the cam faces on the transfer cam disk 36 which is attached to the accumulator gear wheel 35 as described hereinbefore. An insulation block 79 secured to frame 77 cooperates with the center blade 80 of a set of contact blades 80, 81 and 82. A finger 83 extending from the frame 77 cooperates with the periphery of the transfer disk 36.

When the accumulator wheel is located in the nine position (Fig. 11) a notch 84 in the disk is in line with finger 83 and allows frame 77 to rock in a counterclockwise direction, permitting the center spring contact blade 80 to rise, closing the contacts 85 between the two upper blades.

If the accumulator wheel passes from the nine to the zero position during an adding operation (Fig. 10) a projection 86 on disk 36 strikes the finger 83 and rocks the frame 77 in a clockwise direction. The block 79 then depresses the center blade 80 below the normal position and closes contacts 87 between the two lower blades. A latch 88 pivoted at 89 cooperates with a shoulder 90 to hold the frame in shifted position after the wheel passes the camming position. A spring 91 holds the latch in position until the end of the adding cycle when one of the rollers 73 strikes the latch and releases frame 77 for movement counterclockwise into normal position as urged by blade 80.

After accumulating, the wheels are restored to the normal zero position, finger 83 rests on the concentric edge of the disk, and frame 77 holds the center blade 80 with both contacts 85 and 87 opened.

Each lower contact 87 is wired in series with the next higher order accumulator magnet C or D in a manner to be explained more fully hereinafter with reference to the wiring diagram.

The upper contacts 85 are also wired to connect to higher order magnets so that if a transfer impulse is directed to the magnet associated with closed contacts 85, the impulse is carried through them to the next higher magnet. The transfer impulses through the contacts 85 and 87 are timed to occur after the cam projection 51 passes the extension 53, so that if a transfer is desired the magnet C or D is energized, releasing lever 41 and clutching the accumulator gear for one step of movement after which the clutch lever is again thrown out by the engagement of cam projection 52 with extension 53.

The highest order upper contacts 85 are used in minus balance testing, and the contacts 87 are used to declutch the accumulator wheels at zero in total taking and for printing the total in a manner more fully explained hereinafter.

The energization of the units order magnet at the ten rather than the nine position during complement addition has been mentioned before in this specification. The extra unit thus gained fills out the complement to the true tens complement of the number being subtracted. If the number represented on a record card contains a zero in the units column, the rotation of the units order wheel through ten steps of movement will actuate the transferring mechanism to induce a carry into the higher order wheel, thus automatically carrying the extra unit to the higher orders to fill out the complement.

Printing mechanism

The printing mechanism includes a platen 92 (Fig. 2) and a series of type carriers 93 each having a plurality of type elements 94 adapted to be struck by a hammer 95 loosely pivoted on a shaft 96. The type carrier is connected at its lower end to an arm 97 fulcrumed at 98. Springs 99 connected to the arms 97 and to a cross beam 100 connected between arms 101 pivoted at 102, tend to raise the arms 97 to raise the type carriers. A restoring bail 103 connected by links 104 to arms 101 is adapted to restore the arms 97 to their lowest or normal position.

An arm 105 (Fig. 1) fixed to the shaft 102 on which the arms 101 are also fixed, is connected by a link 106 to a complementary cam follower arm 107 pivoted at 108 and cooperating with cams 109 and 110 on cam shaft 111.

Shaft 111 is driven through a chain of gears 112, 113, and 114 the latter of which is mounted on shaft 23'. The shaft 23' turns synchronously with the feeding of the cards through the machine and the bail 103 (Fig. 2) is thus raised so as to permit the type carriers to rise synchronously with the feeding of the card. Thus when the type element 94 carrying the numeral nine is approaching the printing line with respect to platen 92 and the actuating hammer 95, the nine position on the card will be passing the reading brushes 5. If there is a perforation in the card at the nine position, a circuit will be closed through the brush 5 to the printing magnet PM (Fig. 2) of that particular column. This will attract the associated armature 115 which is connected to one of the rods 116 which at the other end is connected to the latching member 117 of the particular column. This will release the latching pawl 118 permitting it to cooperate with the ratchet teeth 119 carried by the type carrier to stop the type carrier with the nine type 94 in line for printing.

When the arms 101 raise the bail 103 to permit the type carriers to rise, the springs 99 will be stretched when the type carriers are latched and the arms 97 are stopped in differential positions. After printing has been effected, the arms 101 are then lowered with the bail 103 to restore the type carriers to normal position.

The latching pawls 118 must then be restored before the type bars can begin their next upward movement. For this purpose a ball 120 is adapted, when rocked clockwise, to rock the latching pawls 118 counterclockwise against the action of their springs and permit them to be latched by the latches 117. The bail 120 is connected by links 121 to arms 122 fixed on shaft 123 on which is also fixed an arm 124 (Fig. 1) connected by link 125 to an arm 126 pivoted at 127 and connected to a cam follower arm 128

(Fig. 2) adapted to be actuated by a cam 129 on shaft 111.

The several type actuating hammers 95 are actuated by individual springs 130 tending to rock them against the type 94 to effect printing. The hammers are normally locked in their inoperative position by individual latches 131. These latches are connected to levers 132 adapted to be moved to the left by a bar 133.

The bar or bail 133 is pivoted at 134 and is connected to an arm 135 (Fig. 1) connected by a link 136 to a bell crank 137 in turn connected by a link 138 to an arm 139 fixed at 140 to a shaft which carries (see Fig. 2) a cam follower arm 141 having rollers 142 cooperating with complementary cams 143 mounted on shaft 111.

The bail 144 which restores the hammers to normal position is supported on a pair of arms fixed on the shaft 96 to the end of which is fixed the crank 137 (Fig. 1). The pin and slot connection 145 between link 136 and arm 135 permits the shaft 96 to turn clockwise a slight amount without link 136 moving arm 135, in order that bail 144 (Fig. 2) may be moved out of the path of the hammers 95 before the arm 135 and bail 133 are actuated by link 136 to release the hammers.

Where listing is to be effected on a listing sheet 146, as shown in Fig. 6, while an item is also being accumulated, the printing magnet PM will be connected to receive an impulse through the perforation in the card simultaneously with the transmission of such impulse to the accumulator magnet C or magnet D. The amount may be listed whether the item is a debit or a credit.

The total taking contact switch

Figure 12:
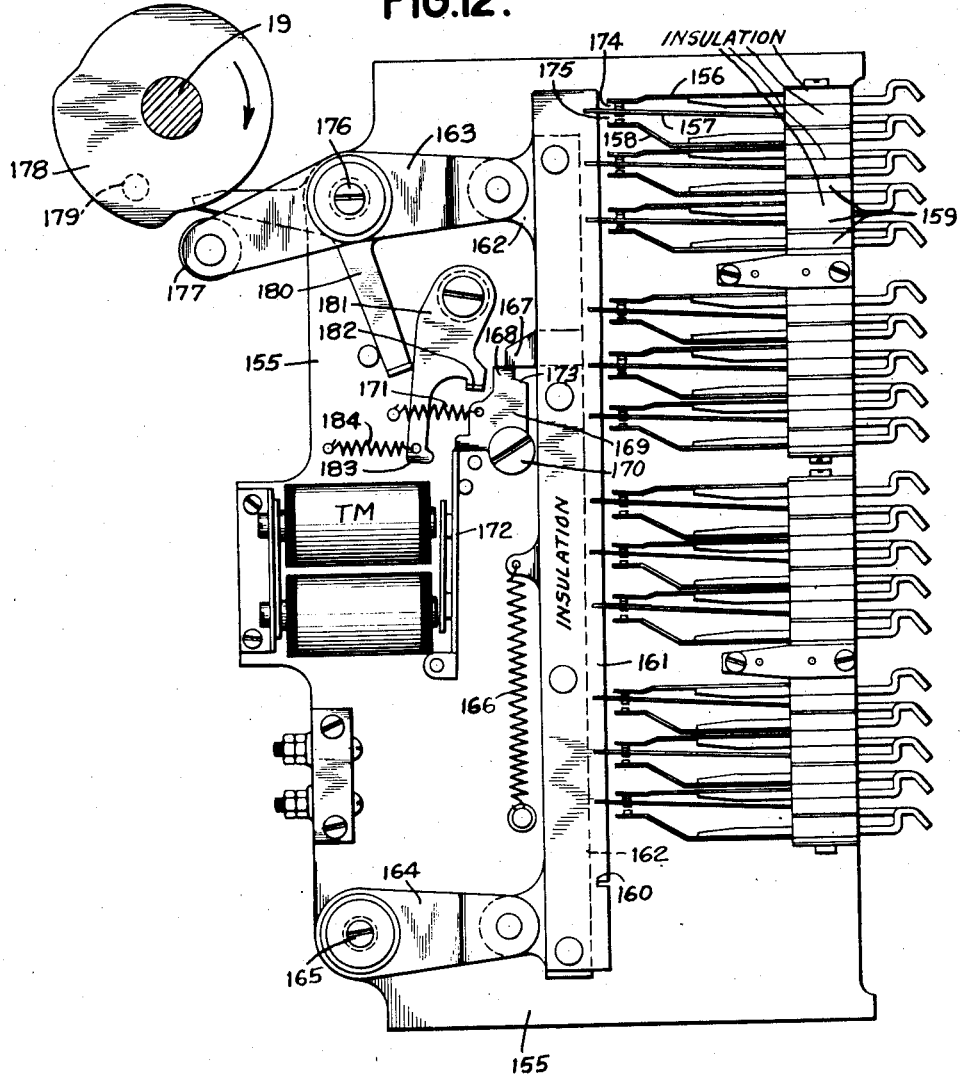
Fig. 12 is a side elevation view of the total contact control switch.

When a total is to be taken of a group of items which have been accumulated, and the total or balance is to be printed, it is necessary to open certain listing circuits and close certain total printing circuits. The mechanism for effecting these circuit changes is shown in Fig. 12 in which a magnet TM is adapted to be energized either by depression of the total key or automatic operation of group control devices whenever a total is to be taken.

Suspended from the base of the machine is a plate 155 (Fig. 12) supporting a series of contacts arranged in tiers for compactness. Each group of contacts comprises an upper blade 156, a center blade 157, and a lower blade 158. The one end of each blade is fastened to the frame plate 155, and insulated from the other blades, by insulation blocks mounted on the plate. The other ends of the upper and lower blades are free, but the end of each center blade 157 fits into a horizontal slot 160 cut in the side of a bar 161 made of insulating material. The bar 161 is mounted on a vertical link 162 pivotally connected near the upper end to bell crank 163, and connected near the lower end to an arm 164, pivoted on stud 165. The link 162 is urged downwardly by a spring 166, but is normally supported in a raised position by an extension 167 on the link, abutting down against the top shoulder 168 of a latch 169 pivoted at 170 and urged by spring 171 into cooperation with the top of armature 172 associated with magnet TM.

When the magnet TM is energized, the armature 172 is drawn to the left (Fig. 12) latch 169 is released and swings counterclockwise, withdrawing shoulder 168 from beneath extension 167 and permitting the link 162 to fall and rest on lower shoulder 173. As the link lowers, the bar 161 depresses the ends of blades 157 breaking the upper contacts 174 and closing the lower contacts 175. Thus, the connections from the analyzing brushes to the printing magnets are opened, and the connections from the transfer contacts 87 in the accumulator to the printing magnets are closed, by the operation of the contacts 174, 175 as explained more fully hereinafter with reference to the wiring diagram.

When link 162 lowers, the bell crank 163 pivoted at 176 is rocked into position to place roller 177 on one arm, into cooperation with a restoring cam 178 mounted on shaft 19. The rise on cam 178 operates crank 163 in a counterclockwise direction, lifting link 162 into a position to be latched.

Latch 169 and armature 172 are restored to normal latching position by connections comprising a pin 179 on cam 178, adapted to strike a crank 180 centered at 176 and having a lower arm for pushing a restoring lever 181 to the right. Projections 182 and 183 on the lever 181 cooperate with latch 169 and armature 172 respectively, and serve to restore the same when the lever 181 is operated by the pin 179 through crank 180. A spring 184 restores lever 181 and, through said lever, holds crank 180 in position to be operated by pin 179.

The plugboard circuit breaker switch

During accumulating, total taking and transferring operations, it is necessary to break connections between the sensing brushes, the accumulator magnets and the total printing contacts in order thus to prevent back circuits.

The devices for opening and closing the contacts PBCA and PBCB (Fig. 13) are shown in Fig. 2. A plate 185 is fastened to the machine frame near the card feed controlled shaft 154. The plate carries a series of contacts arranged in groups of three, an upper blade 186, a center blade 187, and a lower blade 188. Each center blade 187 projects into a slot 189 cut in the side of a vertical insulation bar 190 riveted on a link 191. A bell crank 192 pivoted at 193 is pivotally connected to the link 191 at 194, and on the end of a vertical arm carries a roller 195 cooperating with a cam 196 on shaft 154. Another horizontal arm (not shown) guides the lower end of link 191, similarly to arm 164 (Fig. 12). The cam 196 has three different concentric levels 197, 198 and 199 for adjusting crank 192 and controlling the contacts.

Early in the counterclockwise movement of cam 196, the roller is raised to level 197 and the crank is rocked counterclockwise to close the upper contacts PBCA and condition the machine for adding so that the impulses from the lower brushes are directed to the accumulator magnets. At transferring time, the crank roller 195 falls to level 198 and closes the lower contacts PBCB enabling the transmission of transferring impulses through the transfer contacts to the accumulator magnets. Then finally the crank is brought to rest on level 199 whereupon both contacts PBCA and PBCB are opened and the machine is adapted to take a total.

The machine operating connections

Figure 13:
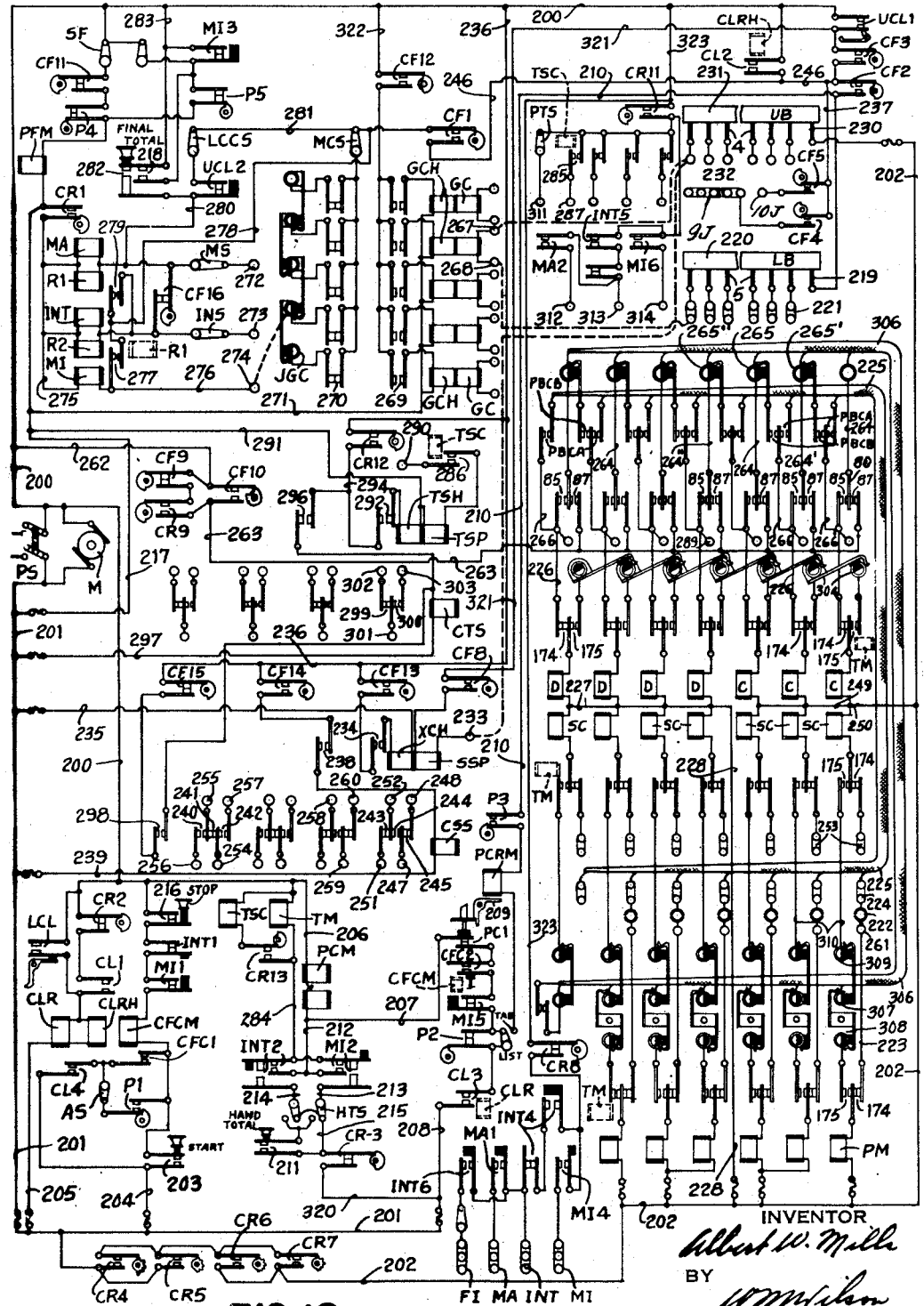
Fig. 13 is the wiring diagram of the machine.

The wiring diagram in Fig. 13 shows the control connections in the machine for effecting adding, subtracting, transferring, printing and total taking.

The source of energy is at PS and includes the lines 200 and 201. When the switch is closed at PS, the operating motor M is energized and turns the shafting to which may be clutched the various mechanisms in the machine. Another main line 202 is connected to line 201 through contacts CR4, CR5, CR6, and CR7 which are closed instantaneously as the index point positions on the card appear under the upper and lower brushes 4 and 5.

When the start key is depressed, contacts 203 are closed and a circuit is established from line 200, through the stop key contacts 216, contacts INT1 and MI1, card feed clutch magnet CFCM, contacts 203 and wire 204 to line 201. The energization of magnet CFCM will cause operation of the card feeding mechanism to feed cards through the machine. This magnet also controls contacts CFC1 and CFC2, closing them when the magnet is energized. As the cards feed through the machine they depress the card levers and close upper card lever contacts UCL1 and lower card lever contacts LCL.

When contacts LCL are closed, a circuit is established through magnets CLR and CLRH, from line 200, through contacts LCL, magnets CLR, CLRH, in parallel, and wire 205 to line 201. The magnet CLRH when energized forms a holding circuit by closing contacts CL1 which are in series with contacts CR2 which close when contacts LCL open. The other magnet CLR closes contacts CL4 in parallel with start key contacts 203, so that by means of contacts CFC1 and CL4 the energization of magnet CFCM is maintained after the start key is released. If the auto start switch AS is closed as shown, the closing of the contacts P1 at the end of a total cycle serves to energize the magnet CFCM and resume card feeding. If cards fail to feed because of an empty magazine or jammed cards, the contact LCL remains open and the circuit is opened at CL4, deenergizing the card feed clutch magnet and stopping the card feeding mechanism.

If printing is to be effected under control of the cards being fed through the machine, the list switch LIST is closed, as shown, so that when contacts CFC2 are closed by magnet CFCM and contacts CL3 are closed by magnet CRL, the printing clutch magnet PCM is energized. The circuit is as follows: line 200, wire 206, magnet PCM, wire 207, contacts PC1, contacts CFC2, contacts MI5, the switch arm, contacts CL3, and wire 208 to line 201. The energization of magnet PCM causes the printing operation devices to be clutched to the main operating mechanism so that the type bars and associated mechanism are operated. If tabulating control of printing is desired, the switch may be shifted to TAB, then during the printing of the first card after a total, contacts P2 open to deenergize magnet PCM. The magnet remains deenergized during the accumulation of a group of cards because contacts PC1 are opened by the unlatching of armature 209 by energization of magnet PCRM. The circuit includes line 200, contacts CL2 closed by magnet CLRH, contacts CF2, wire 210, contacts P3 closed during the printing of the first card after the total, magnet PCRM, the switch arm at TAB, contacts CL3 and wire 208 to line 201.

The magnet PCM may be energized for the printing of a total by the automatic closing of contacts MI2 or INT2, or the closing of contacts 211 by the hand key. The circuit is from line 200, wire 206, magnet PCM, wire 212, contacts MI2 or INT2, wire 213 or 214, the switch HTS in the position shown for automatic totals or moved to the left for hand totals, thence through wire 215 or contacts 211, contacts CR3 normally closed, and wire 320 to line 201.

While the machine is in operation and cards are being fed the machine may be stopped at any time by depression of the stop key to open the contacts 216. This will break the circuit through the card feed clutch magnet CFCM which then allows contacts CFC2 to open to deenergize the printing clutch magnet PCM. The operating motor will continue to operate until the switch at PS is opened.

A platen feed mechanism is provided to feed the record paper before printing in both listing and total operations. A platen feed magnet PFM, when energized acts to clutch the platen spacer to the driving mechanism. The circuit through the platen feed magnet is as follows: line 200, switch SF, contacts CF11, contacts P4 closed during printing, paper feed magnet PFM, and wire 217 to the other line 201. The magnet may be energized by automatic total taking by the closing of contacts MI3 and contacts P5. Or the back contacts 218 associated with the final total key may close the paper feed control circuit when this total key is depressed and contacts P5 are closed during printing.

It is noted that in Fig. 13 the accumulator magnets are divided in two sets, four debit counter magnets D and three credit counter magnets C. If desired, all magnets may be used as a single adding counter or a single counter receiving true numbers of one class and complements of another class. As the accumulators are shown, both credit and debit items may be entered as true numbers and complements and the balance may be printed as a true number, whether it is a debit balance or credit balance.

In an ordinary adding operation, as the card passes the lower brushes 5 the amount perforated therein is added and printed. The circuit is from line 200, contacts CL2 and CF2, common brush 219, contact roller 220, brush 5 touching roller 220 at a differential time controlled by the location of the perforation, jack 221, a plug wire to jack 222 if both adding and listing control is desired; then the circuit branches out in two parallel circuits, the printing or listing branch includes wire 223, contact 174, printing magnet PM and line 202; the adding branch continues through jack 224, cable 225, contact PBCA closed during accumulating, wire 266, wire 226, contacts 174, the accumulator magnet D, bus bar 227 and wire 228 to line 202. The energization of the accumulator magnet acts to clutch the accumulator wheel to the driving gear and rotation continues until cam 51 (Fig. 7) declutches the gears.

When the cards are fed through the machine, they first pass under the upper brushes 4 at UB, and then a cycle later they pass under lower brushes 5 at LB. As a card passes under the upper brushes it is sensed to determine whether it carries a credit item accompanied with a special perforation such as the X hole 2 (Fig. 3). If such a perforation is sensed, devices are operated to shift contacts so that the true number sensed from the card is directed to the credit accumulator instead of the debit accumulator, and the complement is added to the debit accumulator. The subtraction selection control circuit is as follows: from the line 202, common brush 230, contact roller 231, the upper brush 4 cooperating with the particular card column containing perforation 2, jack 232, a plug wire to jack 233, subtraction selection pick-up magnet SSP, contacts CF8 closed as the X hole passes under brush 4, wire 321, and through contacts UCL1 to line 200. When magnet SSP is energized it closes contacts 234 and a holding circuit is established through magnet XCH.

The holding circuit is from line 201, wire 235, magnets XCH, contacts 234, contacts CF13, and wire 236 to line 200. As magnet XCH is maintained energized, it holds contacts 238 closed so that the class selection subtraction magnets CSS is held energized during the accumulating portion of a subtraction operation. The circuit through magnets CSS is from line 201, wire 239, magnet CSS, contacts 238, contacts CF14 and wire 236 to line 200. The magnet CSS is associated with groups of subtraction selection contacts 240, 241, 242 and 243, 244, 245 which determine the distribution of the timed impulses sent out early in a machine cycle, and the impulses from the lower brushes. It serves also to close contacts 298, the function of which is described hereinafter.

If the item on the sensed card is a debit amount, the subtraction selection contacts remain in the position shown. Then early in the cycle the credit accumulator wheels are clutched to begin adding the complement of the debit amount. The circuit is from line 200, contacts CL2, wire 246, wire 237, contacts CF4 closed at the nine index point in the cycle, jack 9J (the circuit for the units order of the counter is connected through jack 10J in line with contacts CF5 closed at the ten index point position), a plug wire to jack 247, contacts 245, jack 248, a plug wire to the particular order jack 224, cable 225, contacts PBCA, wire 266, wire 226, contacts 174, magnet C, bus bar 249 and wire 250 to line 202. For each higher order there is provided a pair of contacts such as contacts 245, a plug wire reaching to jack 9J and another plug wire leading to the related jack 224. The credit accumulator wheel continues to move until a perforation is sensed under the lower brushes. Then the related magnet SC is energized to declutch the wheel. The circuit includes the lower brush jack 221, a plug wire to jack 251, contacts 243, jack 252, a plug wire to the related jack 253, contacts 174, magnet SC, bar 249 and wire 250 to line 202. At the same time that the magnet SC in the credit accumulator is energized, the magnet D of the same order in the debit accumulator is energized by an impulse from the same lower brush 5.

The connection is from the jack 221 of the lower brush, a plug wire to jack 254, contacts 241, jack 255, a plug wire to the debit accumulator jack 224, cable 225, contacts PBCA, wire 266, wire 226, contacts 174, magnet D, bar 227 and wire 228 to line 202. The magnet D acts to clutch the debit wheel to begin the addition of the true debit amount, the wheel being declutched by cam 51 (Fig. 7).

If a card carries a credit item the subtraction selection contacts 241, 243, 245 are opened and contacts 240, 242, 244 are closed by magnets CSS and the connections already explained. Then the impulses initiated early in the machine cycle are directed to the debit accumulator so that it starts to add the complement of the credit amount. The impulse through the card is directed to the magnet SC in the debit accumulator to terminate the addition of the complement at the same time that the magnet C is energized to start adding the true credit amount. The jack 256 is connected to jack 9J (the units order to jack 10J) and jack 257 connects to a jack 253 associated with the debit accumulator. The other plug wire connections to the contacts remain as explained in the foregoing description of the wiring for subtraction selection.

Certain of the contacts under control of the magnets CSS may be used as class selection contacts to control the distribution of the impulses from the lower brushes so that items will be taken from two fields on a record card and selectively connected to one group of printing magnets to print only the true numbers from the fields. For example, from debit and credit items presented to the machine it may be desirable to print the true numbers of both classes in a single column as shown in Fig. 6. The jack 255 may be connected to a jack 258, and the jack 248 may be connected to jack 260, then with jack 259 connected to a certain jack 261 only the true amounts will be printed as the debit and credit amounts and complements are added in the accumulators.

Transferring from one order in an accumulator to the next higher order is effected as explained in connection with the mechanism shown in Figs. 7, 8, and 9. The wiring connections are shown in Fig. 13. If the accumulator wheel of any order passes from nine to zero during an adding operation, it will cause the contact 87 to close, see Fig. 10. The contact CF9 is opened during the amount entry and transferring portions of a cycle to prevent the passage of an impulse through the contacts CR9 which are closed during item entering and total cycles. After the accumulator wheel is disengaged, the contacts CF10 (Fig. 13) are closed momentarily. This closure takes place after cam 51 (Fig. 7) passes the extension 53 of clutch lever 41 so that the lever may again be operated. The circuit includes the line 200, wire 262, contacts CF10, wire 263, contacts 87 of the units order in the credit accumulator (i. e. the contacts 87 in the third group of contacts from the right Fig. 13) wire 264, through unplugged jack 265, contacts PBCB closed during transferring, wires 266 and 226, contacts 174, tens order credit magnet C, and wire 250 to the line 202.

As soon as one step of carry movement is imparted to the tens order wheel, the cam point 52 (Fig. 7) cams the pinion 37 out again so that the accumulator wheel again stops after having received the additional movement. If the tens order accumulator wheel is standing at nine when the transfer impulse is directed through the related magnet, the impulse is carried on to the next higher order through the contacts 85. With the wheel at nine, the contacts 85 are closed as seen in Fig. 11. Therefore when the current passes from wire 266 to wire 226, it may also pass through the contacts 85 in the tens order (i. e. contacts 85 in the second group of contacts from the right, Fig. 13) thence through wire 264', jack 265', contacts PBCB, wire 266', wire 226, contacts 174, hundreds order magnet C, bar 249 and wire 250 to line 202. In a similar way, a transferring impulse directed through a debit magnet D may be passed on to the next higher order magnet. Thus, if the accumulator wheel of the tens order is standing at nine at the end of an accumulating operation, and the wheel of the units order passes from nine to zero, a unit will be carried into the accumulator wheel of the tens order and another unit will be carried through the tens order into accumulator wheel of the hundreds order.

The machine is provided with group control devices for sensing and comparing the group number perforations on successive cards under the upper and lower brushes. For this purpose each one of a group of magnets GC is connected in series with an upper and a lower brush. A plug wire may connect jack 267 to jack 232, and another plug wire may be placed between jack 268 and jack 221. Then, if the perforations in a certain column on successive cards agree in index position, the related magnet GC is energized to prevent the taking of an automatic total. The magnets GC are associated with contacts 269 in series with group control holding circuit magnets GCH, so that when magnet GC is energized, contact 269 is closed and is held closed by the energized magnet GCH which at the same time opens a group control contact 270. The circuit through magnets GCH is from line 201, wire 217, wire 271, magnets GCH, contacts 269, contacts CF12, and wire 322 to line 200.

The opened contacts 270 prevent the energization of the major, intermediate and minor group control magnets MA, INT, and MI which may be connected in series to one or more of said contacts in parallel by plug wires from jacks 272, 273 and 274 to jacks JGC.

When one or more of the contacts 270 remain closed indicating a change in record card group, the connected group control magnet is energized. Taking the minor control as an example, the circuit is from line 201, wire 217, contacts CR1, wire 275, magnet MI, wire 276, jack 274, plug wire to the second jack JGC, one or both contacts 270, control switch MCS, contacts CF1 closed after comparing cards, wire 246 and contacts CL2 to the line 200. The energized magnet MI acts to operate all the MI contacts throughout the machine, opening some and closing others to stop the regular adding and listing operations of the machine so that an automatic total taking operation may take place.

If the change in group number on the cards takes place in the columns associated with the intermediate group control, magnet INT is energized by connections substantially the same as those explained with reference to the minor control. However, in energizing magnet INT, another magnet R2 is energized. This magnet is associated with contacts 277 in series with magnet MI so that it also is energized through contacts 277 and wire 278 to contacts CF1. Thus, the INT and MI contacts are operated on change in intermediate classification.

When the major group control magnet MA is energized, another magnet R1 is also energized. This magnet R1 acts to close contacts 277 and other contacts 279 in series with the magnet INT and wire 278. Thus the MA, INT, and MI contacts are operated on a change in major classification.

The major control magnet MA may be energized under control of the passage of the last card from under the upper card lever. The circuit includes wire 280, contacts UCL2 closed as the last card leaves the upper brushes, switch LCCS and wire 281 to contacts CF1.

A final total key may be depressed to close contacts 282 and energize the major control magnet MA. The circuit includes wire 280, contacts 282 and wire 283 to line 200.

When a total is to be taken, the contacts MI2 or INT2 close to energize the total selection control magnets TSC and TM. The circuit is from line 200, magnet TM, and in parallel therewith, magnets TSC through contacts CR13, wire 284, contacts MI2 or INT2, wire 213 or 214, switch HTS, wire 215, contacts CR3 and wire 320 to the line 201. The energized magnet TM then acts to shift three sets of contacts 174, 175 as explained with reference to Fig. 12. The other magnet TSC closes contacts 285 and 286 to establish minus balance testing and holding circuits for total selection.

The testing circuit is connected from line 200, contacts CR11 closed early in a total taking cycle, contacts 285, plug socket 287, a plug wire to socket 265" associated with the highest order debit bank, the plugging of this socket also breaks the transferring connections between the highest order debit bank and the lowest order credit bank; the circuit continues through wire 264", contacts 85, socket 289, plug wire to socket 290, contacts 286, the total selection pick-up magnet TSP, wire 291 and wire 217 to line 201. If the debit accumulator contains a true number, the highest order wheel does not stand at nine (the capacity of the accumulator is understood to be one order less than the number of orders or banks provided) and the transfer contacts 85 remain open and magnet TSP is not energized. However, should the debit accumulator contain a complement, the highest order wheel is at nine and contacts 85 are closed with the above-traced circuit effective. When the magnet TSP is energized it closes contacts 292 and establishes a total selection holding circuit through magnet TSH. The circuit through TSH is as follows: the line 200, wire 236, contacts CR12, wire 294, contacts 292, magnet TSH, wires 291 and 217 to line 201. The magnet TSH closes contacts 296 to energize the class selection or total selection magnet CTS. The impulse through magnet CTS comes through line 200, wire 236, contacts CR12, contacts 296, magnet CTS and wire 297 to line 201. The magnet CTS may be energized for class selection during card feeding time also, by the closing of contacts CF15 automatically, and the closing of contacts 298 by magnet CSS. The magnet CTS controls the opening of contacts 299 and the closing of contacts 300. A plug socket 301 in line with contacts 299, 300 is connected to conduct impulses from the debit and credit accumulators. The total printing impulse usually goes from the debit accumulator order through closed contacts 299 and plug socket 302. However, if the balance is a credit amount, magnet CTS is energized and contacts 300 close to direct impulses from the credit accumulator through contacts 300 and plug socket 303.

In the total taking cycle the magnets C or D of the selected accumulator are energized early in the operation to clutch the accumulator wheels and start them revolving toward the zero position. The cancelling circuit includes line 200, wire 323, contacts CR8 closed at the ten index position, contacts INT6, MA1, INT4 or MI4 according to the nature of the group change, plug socket FI, MA, INT or MI and plug wires to sockets 304, contacts 175 closed for totals, magnets C or D and wires 250 or 228 to line 202. The accumulator wheels 35 (Fig. 7) are clutched and continue to revolve until they arrive at the zero position. Then the transfer contacts 87 are closed and direct impulses through magnets SC for declutching and magnets PM for total printing. The total printing circuit is from line 200, wire 262, contacts CF9 normally closed and not operated on totals, CR9 closed during total printing, wire 263, transfer contacts 87, wire 264, socket 265, cable 306, plug sockets 307 and then directly to plug sockets 308 or plugged to print in a selected position on the record sheet or plugged through contacts 299, 300 to print totals selectively in one field under control of either accumulator, from plug socket 308 to contacts 175 and then through the printing magnet PM to the line 202. Thus the total is printed whether the accumulator wheels are declutched at zero for a clearing total or continue to rotate for ten steps back to the numeral storing position for a progressive total.

The wheels are declutched at zero for a clearing total by the energization of magnets SC under control of the closing of contacts 87. The circuit is the same as the total printing circuit from line 200 through contacts 87 and up to plug sockets 307; then connections are made to plug sockets 309, through wires 310, contacts 175, magnets SC, bars 227 or 249 and wires 228 or 250 to line 202. Thus the total is printed and the wheels are cleared ready for a new series of item entries.

The total selection control may be connected to place various classes of totals in a single printing field or column. Under such control, a series of minor or intermediate totals may be printed in a column and then when a major total is to be printed the class selection contacts are shifted so that the readings from the accumulator orders under major control are directed into the same columns used in minor control. The selection pick-up circuit runs from line 200, contact CR11, contacts MI6, INT5 or MA2, sockets 312, 313 or 314, a plug wire to socket 290, contacts 286, magnet TSP and wire 291 to line 201. Then through the various holding relays and contacts, magnet CTS is energized and serves to shift contacts 299, 300. These contacts are connected in series with the printing magnets by plugging socket 301 to socket 308, socket 302 to the socket 307 in line with an order under minor control, and socket 303 to a socket 307 connected to an accumulator order operated under major control.

For certain classes of accounting work it is desirable to be able to secure a printed record of the total or balance of a group of items entered into an accumulator without resetting the accumulator wheels to zero. This is known as taking a progressive total. The amount registered by the accumulator wheels after the taking of such a total is the same as the amount they registered before the totaling operation was performed. An example of a progressive totaling operation is shown in Fig. 6. There it is noted that after the accumulation of the first four items a printed record of the balance 54 is made without resetting the accumulator wheels in counters C or D. The debit balance 54 is then retained as an old balance and accumulated with a subsequent set of items, the result being a negative balance of 165.

To secure progressive totaling control in the machine, the impulses through contacts 87 are prevented from reaching magnets SC, thus maintaining these magnets in a deenergized state and failing to declutch the accumulator wheels at zero and allowing them to remain in mesh for ten steps of movement so that they move back to the total numeral registering position. The de-energizing of magnets SC is brought about by inserting blank plugs in sockets 309, breaking the circuit between sockets 307 and magnets SC.

The progressive totaling operation may be placed under control of the total selection devices. A hand switch may be positioned to print all totals progressively and opened to secure clearing totals. The progressive total selection circuit includes line 200, contacts CR11, switch PTS closed to select progressive totals and opened to cause clearing totals, socket 311, plug wire to socket 290, contacts 286, magnet TSP and wire 291 to line 201. Then the magnet TSP acts through various holding relays and contacts, as explained hereinbefore, to energize magnet CTS and shift contacts 299 and 300 on each total taking operation provided switch PTS is closed. The plug socket 301 is connected to socket 307, socket 303 is connected to socket 308, and socket 302 is plugged to socket 309. Thus the connections between sockets 307 and 309 to carry the impulses to the magnets SC for clearing the accumulator, are through contacts 299. If magnet CTS is energized for a progressive total the contacts 229 are opened to prevent clearing. At the same time the contacts 300 in the printing circuit are closed to print a progressive total.

Since the basic novel features of the invention have been shown and described as applied to a single modification, it will be understood that various omissions and substitutions and changes in the form and details of the device illustrated and changes in its operation may be made by those skilled in the art without departing from the spirit of the invention. It is the intention, therefore, to be limited only as indicated by the scope of the following claims.

I claim:

1. In a machine of the class described, accumulating wheels, transferring means cooperating with said wheels for carrying units from any order to an adjacent order including contacts closed by said wheels as they pass from nine to zero, and means under control of said contacts for printing a record of the total amount accumulated by said wheels.

2. In a machine of the class described, accumulating wheels, transferring means for said wheels with contacts which are closed as said wheels pass from nine to zero position to carry units from wheel to wheel, and means under control of said contacts for stopping said wheels at the zero position during the taking of a total.

3. In a machine of the class described, accumulating wheels, means for operating said wheels, means for clutching said wheels and said operating means, transferring means with contacts which are closed as said wheels pass from nine to zero position to transfer units from wheel to wheel, and means under control of said contacts for declutching said wheels at the zero position during operation in total taking.

4. In a machine of the class described, an accumulator wheel, means for operating the wheel to enter amounts and take totals, means for clutching and declutching the wheel and said operating means, means for controlling said declutching means to declutch said wheel at the end of each operation, means for controlling said clutching means to clutch said wheel early in a total taking operation, a magnet for controlling the declutching of the wheel, means adapted to energize said magnets when operated by the wheel as it reaches the zero position, and means for de-energizing said last mentioned means to keep the wheel clutched during the taking of a progressive total.

5. In a machine of the class described, an accumulating wheel, means for operating said wheel, means for declutching said wheel from said operating means, a magnet for operating said declutching means, transferring devices cooperating with said wheel including contacts which are closed as the wheel reaches the zero position to add a unit in the next order, and means under control of the contacts for energizing said magnet to declutch said wheel at zero.

6. In a machine of the class described, a plurality of accumulating wheels, transferring means including devices actuated by said wheels and adapted for carrying units from wheel to wheel, means for printing a record of the amount registered on selected wheels, means under control of one of said transferring devices for selecting the wheels from which the record is to be printed, and means under control of other transferring devices associated with the selected wheels for controlling the operation of the printing means.

7. In a machine of the class described, a pair of accumulators comprising a plurality of accumulating wheels, transferring devices including pairs of contacts closed by the wheels when at nine, and pairs of contacts closed by the wheels passing from nine to zero, means for printing a record of the total amount on one or the other of said accumulators, means under control of the contact closed at nine associated with the highest order wheel in one accumulator for selecting an accumulator for total printing, and means whereby said contacts closed at zero in the selected accumulator control said printing means to print the total.

8. In a machine of the class described, a plurality of accumulating wheels, transferring devices cooperating with said wheels including contacts closed when the related wheel stands at nine and other contacts closed as the wheels pass from nine to zero, means for operating the wheels to enter amounts and take totals, means under control of the contacts closed at nine associated with the highest order wheel for adapting the accumulator for total printing, means under control of the contacts closed at zero for printing a record of the total amount on the wheels, and additional means under control of said contacts closed at zero for declutching said wheels from said operating means during total taking.

9. In a machine of the class described, an accumulator wheel, means for driving said wheel, means for clutching and declutching said wheel with the driving means, means for controlling the operation of said clutching means, and a plurality of successively tripped latch devices operated by said controlling means and operative between said controlling means and said clutching means for delaying the declutching operation of said clutching means.

10. In a machine of the class described, an accumulator wheel, driving means, means for clutching and declutching said wheel and said driving means, a spring for operating said clutching and declutching means, a latch for holding said spring from declutching the wheel, a magnet, and means under control of said magnet for tripping said latch, releasing said spring and declutching the wheel from the driving means.

11. In a machine of the class described, accumulating wheels, means for operating said wheels to add and substract amounts, transferring devices, means under control of said transferring devices for carrying units from wheel to wheel, printing means, other means under control of said transferring devices for adjusting said printing means to print a total record of the balance amount on said wheels, and means for selectively connecting said transferring devices to said carrying means or said total printing means.

12. In a machine of the class described, a plurality of sets of accumulating wheels, means for operating said wheels, a cam mounted on each of said wheels, a lever operated by each cam and assuming one position when the wheel is at nine and another position when the wheel passes from nine to zero, pairs of contacts with common center blades operated by said levers for closing either contact, means under control of one contact for selecting one set of wheels for total taking, and printing means controlled by the other contacts of the pairs to print a record of the total amount on the associated wheels.

ALBERT W. MILLS.